United States Patent [19]
Hanson

[11] Patent Number: 5,714,713
[45] Date of Patent: *Feb. 3, 1998

[54] ACOUSTIC ABSORBING DEVICE

[75] Inventor: Jeffrey S. Hanson, Wakefield, R.I.

[73] Assignee: The United States of America as represented by the Secretary of the Navy, Washington, D.C.

[*] Notice: The term of this patent shall not extend beyond the expiration date of Pat. No. 5,712,447.

[21] Appl. No.: 645,736

[22] Filed: May 14, 1996

[51] Int. Cl.⁶ .................. F16F 15/00; B32B 25/04; B63H 21/30
[52] U.S. Cl. .................. 114/20.1; 181/286; 181/290; 181/294; 367/173; 367/176
[58] Field of Search .................. 114/20.1, 20.2, 114/312, 342; 181/208, 284, 286, 290, 292, 294, 296; 156/71; 367/1, 149, 151, 173, 176

[56] References Cited

U.S. PATENT DOCUMENTS

| | | | |
|---|---|---|---|
| 3,130,700 | 4/1964 | Peterson | 114/20.1 |
| 3,783,969 | 1/1974 | Pall | 181/286 |
| 3,821,999 | 7/1974 | Guess et al. | 181/296 |
| 3,948,346 | 4/1976 | Schindler | 181/286 |
| 4,399,526 | 8/1983 | Eynck | 367/149 |
| 4,756,264 | 7/1988 | Ewbank | 114/20.1 |
| 5,389,746 | 2/1995 | Moody | 181/0.5 |
| 5,396,855 | 3/1995 | DuBois | 114/20.1 |

*Primary Examiner*—Michael J. Carone
*Assistant Examiner*—Matthew J. Lattig
*Attorney, Agent, or Firm*—Michael J. McGowan; James M. Kasischke; Prithvi C. Lall

[57] ABSTRACT

An acoustically absorbing device is presented which can be mounted in the structure of a vehicle. The acoustic absorbing device includes an acoustic barrier layer proximate the structure surface, an acoustic absorption material layer adjacent the acoustic barrier layer, and isolation mounts mounting the acoustic absorption material to the structure. The acoustic barrier layer includes either a barrier layer of free airspace or a barrier layer of an acoustic barrier material that is heat resistant and fluid resistant. The acoustic absorption layer is made of a material capable of dispersing incident normal pressure waves within the structure, such as a sintered aluminum absorption material. The mounts are typically spaced throughout the structure and typically include an isolation mounting device that provides isolation from vibrations in the structure.

18 Claims, 3 Drawing Sheets

ACOUSTIC ABSORBING DEVICE

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED PATENT APPLICATIONS

This patent application is co-pending with three related patent applications entitled ISOLATION MOUNTING DEVICE (U.S. patent application Ser. No. 08/645,732), VIBRATIONALLY AND ACOUSTICALLY INSULATED STRUCTURE (U.S. patent application Ser. No. 08/645,735), VIBRATIONALLY DAMPED STRUCTURE (U.S. patent application Ser. No. 08/645,736), by the same inventor as this application.

BACKGROUND OF THE INVENTION (1) Field Of The Invention

This invention relates to an acoustic absorber mechanism and in particular, to an acoustic absorber mechanism which can be used for reducing noise within an underwater vehicle hull.

(2) Description Of The Prior Art

In a typical structure having internal systems that generate noise, a noise reverberation field is built up within the enclosed space of the structure increasing the internal sound. This is of particular concern in underwater vehicles, such as torpedoes, that include propulsion systems such as a motor or engine, internal components such as inertial guidance systems and tape recorders, and propulsors generating radiated noise. In underwater vehicles, a turbulent boundary layer flow noise is also generated and transmitted through the hull. The internal noise generated by the systems and the turbulent flow noise reverberate within the hull structure as pressure waves and increase the internal sound.

Accordingly, absorption materials must be used within the hull structure to reduce the reverberant noise field. However, many prior acoustic absorbing devices have not provided an inexpensive acoustic absorbing device that is effective for use in an underwater vehicle.

For example, U.S. Pat. No. 5,396,855 to DuBois discloses an underwater vehicle tail cone assembly having an elastomer material 16 bounded to inner and outer surfaces of a forward flange 12 of a tail cone assembly. While the tail cone provides some damping of vibrations, it will not effectively absorb reverberating noise within the vehicle. Also, DuBois does not disclose a damping mechanism that can easily be installed throughout the entire interior surface of an underwater vehicle.

SUMMARY OF THE INVENTION

Accordingly, one object of the present invention is to provide an acoustic absorbing structure that effectively attenuates radiating noise within an enclosed structure such as an underwater vehicle hull.

A further object of the invention to provide an acoustic absorption layer and acoustic barrier layer to reduce the noise reverberating within the structure and prevent the noise from being transmitted through the structure and radiating to the environment outside of the structure.

The present invention features an acoustic absorbing device, for reducing noise within a structure, such as an acoustically insulated enclosed vehicle susceptible to internally generated noise and/or externally generated noise. Typically, the acoustically insulated enclosed vehicle includes a hull structure enclosing the vehicle. The acoustic absorbing device or structure is positioned over at least a portion of the hull structure. In a preferred embodiment, the hull structure is that of an underwater vehicle, such as a torpedo, and the acoustic absorbing structure is mounted proximate at least a portion of an interior surface of the vehicle.

The acoustic absorbing device comprises an acoustic barrier layer having a predetermined thickness and covering at least a portion of the surface of the structure. The acoustic absorbing device further comprises an acoustic absorption layer adjacent the acoustic barrier for reducing noise generated within the structure. At least one isolation mount mounts the acoustic absorption layer to the structure.

In a preferred embodiment, the predetermined thickness of the acoustic barrier layer corresponds with the distance from the structure that is necessary to reduce reverberating acoustic waves having a given frequency. In one embodiment, the acoustic barrier layer is a barrier of air. In another embodiment, the acoustic barrier layer includes an acoustic barrier material for breaking up transmitted and reflected pressure waves traveling through the barrier material, and for displacing internal fluid build-up. Preferably the barrier material is made of a fluid resistant and/or a heat resistant material.

In the preferred embodiment, the acoustic absorption layer includes an acoustic absorption material capable of dispersing incident normal pressure waves within the structure. Preferably, a perforated, sintered aluminum acoustic absorption material is used by mounting it to the structure at a distance from the structure substantially equal to the predetermined thickness of the acoustic barrier layer. The preferred embodiment of the isolation mount includes a damping material fixed to a portion of the surface of the structure, a support base fixed to the damping material, a fastener engaging portion extending generally from the support base, and a fastener cooperating with the acoustic absorption material layer and engaged with the fastener engaging portion. The damping material of the isolation mount thereby isolates the support base from vibrations transmitted through the structure so that the acoustic absorption material is mounted to the structure and isolated from vibrations within the structure.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
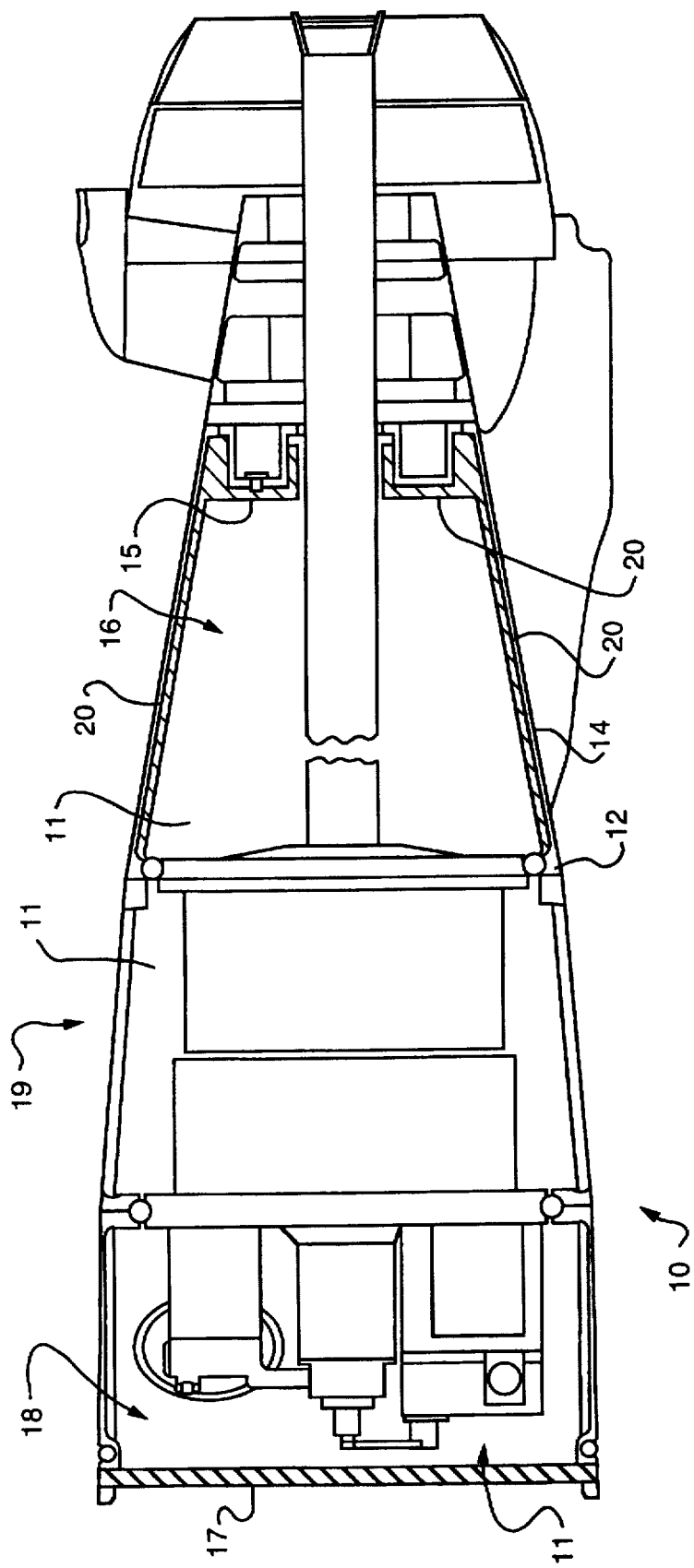
FIG. 1 is a side-sectional view of an underwater vehicle having an acoustic absorbing structure according to the present invention.

An acoustically insulated enclosed vehicle 10, FIG. 1, according to the present invention generally includes a hull structure 12 enclosing the vehicle 10 and an acoustic absorbing device or structure 20 positioned proximate at least a portion of at least one surface 14 and the hull structure 12. The enclosed structure typically includes internal noise generating mechanisms 11, such as the propulsion systems and guidance systems within a torpedo or other similar underwater vehicle. In addition to vehicle hull structures, the present invention contemplates using the acoustic absorbing structure 12 with any structure that houses noise generating mechanisms.

The acoustic absorbing device 20 is mounted proximate at least a portion of an interior surface 14 of the hull structure 12. Typically, where the acoustic absorbing device 20 is mounted depends on where the reverberation of acoustic waves is concentrated. For example, in a torpedo or other similar underwater vehicle, the acoustic absorbing device 20 is preferably mounted around the interior surface 14 but also on the hull's periphery in the sections 18, 16, for example, on the end plate 17 and the bulkhead 15 of a torpedo.

Figure 2:
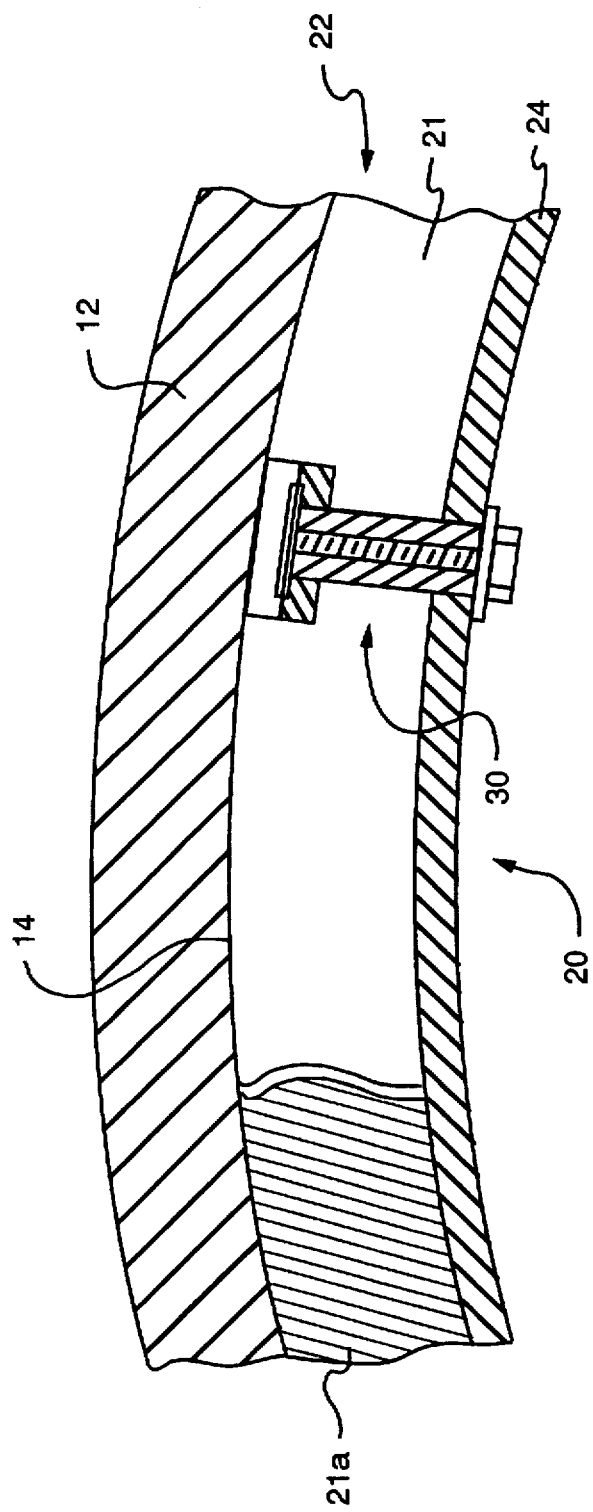
FIG. 2 is a cross-sectional view of the acoustic absorbing structure according to one embodiment of the present invention mounted to a vehicle hull.

The acoustic absorbing device 20, FIG. 2, generally includes an acoustic barrier layer 22, an acoustic absorption layer 24, and at least one mount 30 that mounts the acoustic absorption layer 24 to the structure 12 with the acoustic barrier layer 22 between the acoustic absorption layer 24 and the structure 12. Typically, a plurality of mounts 30 are generally spaced throughout the structure 12 to be acoustically insulated so that the acoustic absorption device 20 is structurally supported against the hull structure 12.

The acoustic absorption layer 24 is made of an acoustic absorption material having a thickness capable of dispersing incident normal pressure (acoustic) waves within the structure 12, thereby absorbing and reducing the reverberant field pressure levels (e.g., noise). In one example, the acoustic absorption layer 24 is made from a 0.063 inch thick, sintered aluminum, sound absorbing plate having substantially random perforations therethrough. This can be a commercially available material such as ALMUTE® manufactured by NDC Co., Ltd. or the like. The present invention, however, contemplates other absorption materials and other thicknesses provided that the absorption material is capable of dispersing incident normal pressure waves and absorbing and reducing the reverberant acoustic waves within the hull structure. The preferred acoustic absorption material in an underwater vehicle such as a torpedo should also be capable of withstanding a wet, high temperature environment.

In the embodiment shown in FIG. 2, the acoustic barrier layer 22 includes an acoustic barrier material 21 held between the absorption material layer 24 and a surface 14 of the hull structure 12. Preferably, the predetermined thickness of the acoustic barrier layer 22 is determined based upon a frequency region defined by the distance from the hull structure 12 in which the most absorption is needed because of a concentration of reverberating acoustic waves. The acoustic barrier material layer further "breaks up" any transmitted and reflected acoustic pressure waves in this predefined frequency region as they travel within the acoustic barrier material, thereby further minimizing the communication of internal airborne generated noise to the hull structure 12.

An acoustic barrier layer 22 made of an acoustic barrier material 21 is preferred for use on a hull structure 12 that is susceptible to fluids, such as an underwater vehicle that permits internal fluid build up. In this embodiment, the acoustic barrier material 21 should be a fluid resistant material that will displace the residual internal fluids from the acoustic barrier layer 22.

The preferred acoustic barrier material 21 for use in an underwater vehicle such as a torpedo is able to withstand high pressures, heat, exhaust, steam or other conditions typical to an underwater vehicle environment. Some examples of an acoustic barrier material 21 include elastomeric and foam fluid resistant acoustic barrier material 21 or a lightweight aluminum foil honeycomb material 21a such as that manufactured by Hexcel Corp. that breaks up the transmitted and reflected pressure waves as they travel through each cell of the honeycomb material. The present invention, however, also contemplates other similar acoustic barrier materials having these desired characteristics.

Figure 3:
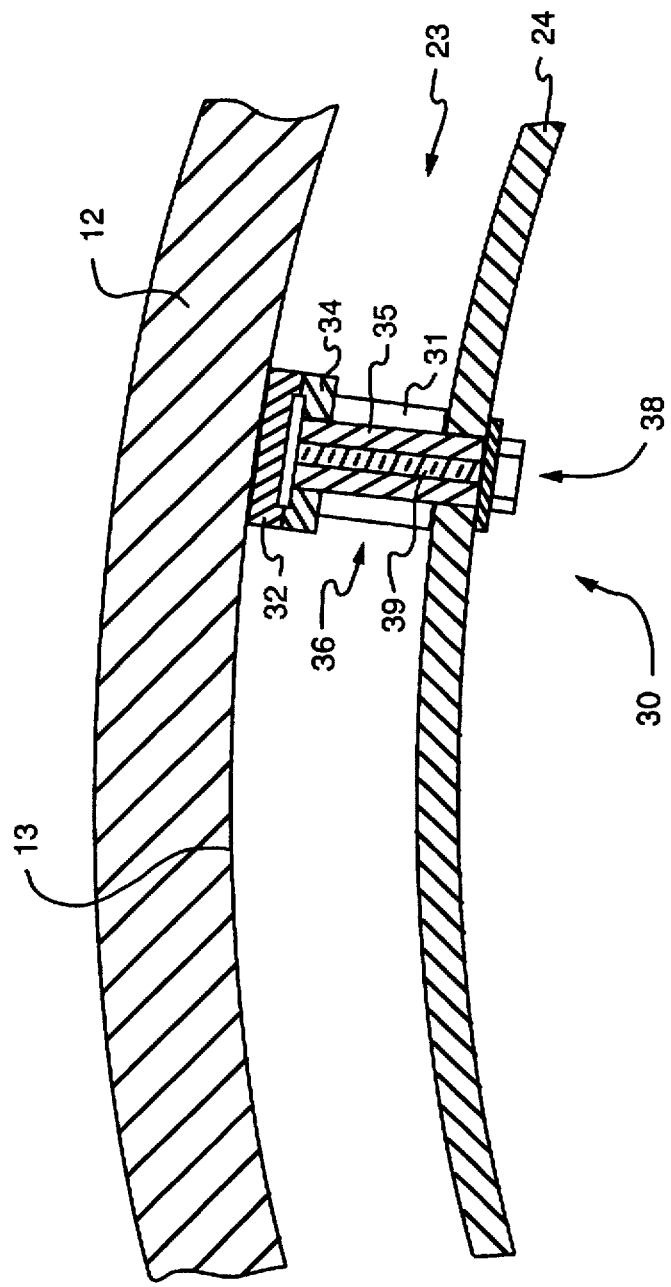
FIG. 3 is a cross-sectional view of the acoustic absorbing structure according to another embodiment of the present invention mounted to a vehicle hull.

In another embodiment, FIG. 3, the acoustic barrier layer includes a layer of air space 23. The acoustic barrier layer of free air space 23 may be used in an enclosed structure that is not susceptible to internal fluids, such as underwater vehicles that do not permit fluid build up. As transmitted and reflected pressure waves pass through the free air space 23, the air space acts as an acoustic barrier to reduce the intensity of the waves. In this embodiment, a standoff portion 31 is used with the mount 30 to mount the acoustic absorption material layer 24 at a distance from the hull structure 12 corresponding to the predetermined thickness of the acoustic barrier air space layer 23.

In the preferred embodiment, the mount 30 is an isolation mount that mounts the acoustic absorption material layer 24 to the structure 12 while isolating the mount 30 and the layer 24 from vibrations transmitted through the structure 12. One type of isolation mount is the isolation mount disclosed in co-pending application Ser. No. 08/645,732 entitled Isolation Mounting Device, incorporated herein by reference.

An isolation mount 30 generally includes a damping portion 32, a support base 34, a fastener engaging portion 36 and a fastener 38. The damping material is bonded to a surface 13 of the structure 12 and is preferably made of block of elastomeric material, such as C-1002-12 manufactured by EAR Division, Cabot Corp., or the like. The present invention contemplates using other suitable elastomers capable of sustaining the particular temperature environment and preventing the transmission of vibrational energy from the structure 12; however, the damping ratio of the material should be near one over a large frequency band.

The elastomeric damping material 32 is preferably bonded to the surface 13 with a bonding compound such as a two part epoxy. Typically the bonding of the damping portion 32 involves first sandblasting the surface 13, then applying the first liquid part of the epoxy to the sandblasted area of the surface 13 and applying the second aerosol spray part of the epoxy compound to the piece of elastomeric damping material 32. Typically, the user has up to one hour to place the damping portion 32 onto the surface 13 but once the damping portion 32 is placed onto the surface 13, the bonding is completed in less than one minute. The present invention contemplates other bonding compounds, epoxies, or acrylic adhesives capable of effectuating a homogenous bond between the damping portion 32 and surface 13 and withstanding the particular temperature environment. Also, a bonding compound or epoxy of lower toxicity is preferred.

The support base 34 is bonded to the damping portion 32 typically in the same manner described above. Preferably, the support base 34 is a block of aluminum material, but the present invention contemplates any material that would sufficiently support the fastener engaging portion 36 and the absorption layer 24 and be capable of bonding to the damping portion 32.

The fastener engaging portion 36 generally extends from the support base 34 and the fastener 38 is fastened to the engaging portion 36 to secure the absorption layer 24 therebetween. Preferably, the fastener engaging portion 36 includes an internally threaded post 35 extending from the support base 34 and the fastener 38 includes a threaded member 39 threadably engaged within the internally threaded post 35. For example, a snap nut can be inserted through a hole punched in the support base 34 and crimped to the support base 34 with a snap nut crimp tool.

Where a barrier material 21 is used (FIG. 2) the post 35 extends through a hole in the barrier material 21 and the fastener 38 securely holds the absorption material layer 24 against the barrier material 21. In an embodiment where free air space 23 is used as an acoustic barrier layer (FIG. 3), a standoff sleeve 31 is positioned around the post 35 and the acoustic absorption layer 24 is held against the standoff sleeve 31 with the fastener 38.

Accordingly, the acoustic absorbing device of the present invention effectively reduces the reverberating noise field within an enclosed structure caused by acoustic waves generated within the structure and vibrational waves transmitted through the structure. The noise reverberating within the enclosed structure is thus prevented from radiating outside of the structure. The acoustic absorbing device is a simple and inexpensive device that can easily be mounted throughout an enclosed vehicle structure without affecting the integrity of the structure. Finally, the acoustic absorbing device can be used in a vehicle susceptible to internal fluid build up and other harsh conditions found in an underwater vehicle such as a torpedo.

In light of the above, it is therefore understood that within the scope of the appended claims, the invention may be practiced otherwise than as specifically described.

What is claimed is:

1. An acoustic absorbing device, for reducing noise within a structure, said acoustic absorbing device comprising:
   at least one isolation mount joined to the structure, said at least one isolation mount being substantially isolated from vibrations transmitted through said structure;
   an acoustic barrier layer having a predetermined thickness, said acoustic barrier layer covering at least a portion of a surface of said structure, said at least one isolation mount extending substantially through said acoustic barrier layer; and
   an acoustic absorption layer mounted on said isolation mount with said acoustic barrier layer between the structure and said acoustic absorption layer.

2. The acoustic absorbing device of claim 1, wherein said acoustic barrier layer is a barrier of air.

3. The acoustic absorbing device of claim 1, wherein said acoustic barrier layer includes an acoustic barrier material which breaks up transmitted and reflected pressure waves traveling through said acoustic barrier material.

4. The acoustic absorbing device of claim 3, wherein said acoustic barrier material is a fluid resistant material.

5. The acoustic absorbing device of claim 3, wherein said acoustic barrier material is a heat resistant material.

6. The acoustic absorbing device of claim 1, wherein said acoustic barrier material is honeycomb material.

7. The acoustic absorbing device of claim 1, wherein said acoustic barrier layer predetermined thickness is calculated based on the frequency of the acoustic energy being absorbed.

8. The acoustic absorbing device of claim 1, wherein said acoustic absorption layer includes an acoustic absorption material capable of dispersing incident normal pressure waves within the structure.

9. The acoustic absorbing device of claim 8, wherein said acoustic absorption material includes a randomly perforated, sintered aluminum acoustic absorption material.

10. The acoustic absorbing device of claim 9, wherein said absorption material is mounted to the structure at a distance from the structure substantially equal to said predetermined thickness of said acoustic barrier layer.

11. The acoustic absorbing device of claim 1, wherein said at least one isolation mount includes:
    a damping material fixed to a portion of the surface of the structure;
    a support base fixed to said damping material, wherein said damping material isolates said support base from vibrations transmitted through the structure;
    a fastener engaging portion extending generally from said support base; and
    a fastener cooperating with said acoustic absorption layer and engaged with said fastener engaging portion for mounting said acoustic absorption layer to the structure.

12. The acoustic absorbing device of claim 11, wherein said fastener engaging portion of said at least one isolation mount includes an internally threaded post extending through said acoustic barrier layer and said acoustic absorption layer, and said fastener is a threaded fastener threadably received in said internally threaded post mounting said acoustic absorption layer to the structure.

13. The acoustic absorbing device of claim 12, wherein said at least one isolation mount includes a standoff sleeve positioned around said internally threaded post, said acoustic absorption layer being mounted between said standoff sleeve and said threaded fastener.

14. An acoustically insulated enclosed vehicle comprising:
    a hull structure; and
    an acoustic absorbing structure proximate at least a portion of said hull structure, said acoustic absorbing structure including:
    at least one mount, joined to said hull structure;
    an acoustic barrier layer of a predetermined thickness covering said at least a portion of said hull structure; and
    an acoustic absorption material mounted with said at least one mount adjacent said acoustic barrier layer, wherein said acoustic absorption material is capable of dispersing incident normal pressure waves within the structure to reduce noise reverberating within the structure.

15. The acoustically insulated enclosed vehicle of claim 14, wherein said hull structure includes an underwater vehicle hull.

16. The acoustically insulated enclosed vehicle of claim 14, wherein said acoustic absorbing structure is mounted proximate at least a portion of an interior surface of said hull structure.

17. The acoustically insulated enclosed vehicle of claim 14, wherein said acoustic absorbing structure is mounted proximate at least a portion of an exterior surface of said hull structure.

18. An acoustically insulated enclosed vehicle of claim 14, wherein said at least one mount is an isolation mount for mounting said acoustic absorption material to said hull structure and isolating said acoustic absorption material from noise transmitted through said hull structure.

* * * * *